March 11, 1924. 1,486,187
R. E. HAYNES
SNOWPLOW
Filed May 9, 1923 2 Sheets-Sheet 1

March 11, 1924.

R. E. HAYNES

SNOWPLOW

Filed May 9, 1923     2 Sheets-Sheet 2

1,486,187

Inventor
R. E. Haynes

Patented Mar. 11, 1924.

1,486,187

UNITED STATES PATENT OFFICE.

ROBERT E. HAYNES, OF POOLE, NEBRASKA.

SNOWPLOW.

Application filed May 9, 1923. Serial No. 637,692.

*To all whom it may concern:*

Be it known that I, ROBERT E. HAYNES, a citizen of the United States, residing at Poole, in the county of Buffalo and State of Nebraska, have invented certain new and useful Improvements in Snowplows, of which the following is a specification.

In carrying out the present invention, it is my purpose to provide a small plow of the rotary type, adapted for attachment to the front end of a motor vehicle, suitable driving connections being provided between the plow element per se, and the crank shaft of the vehicle engine.

A further purpose of the invention is to provide such a snow plow that may be expeditiously associated with a motor vehicle, and when once installed is not liable to become readily out of order, the device embracing at the same time, the desired features of efficiency and durability, and one that may be installed and operated at a minimum expenditure.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein.

Figure 1:
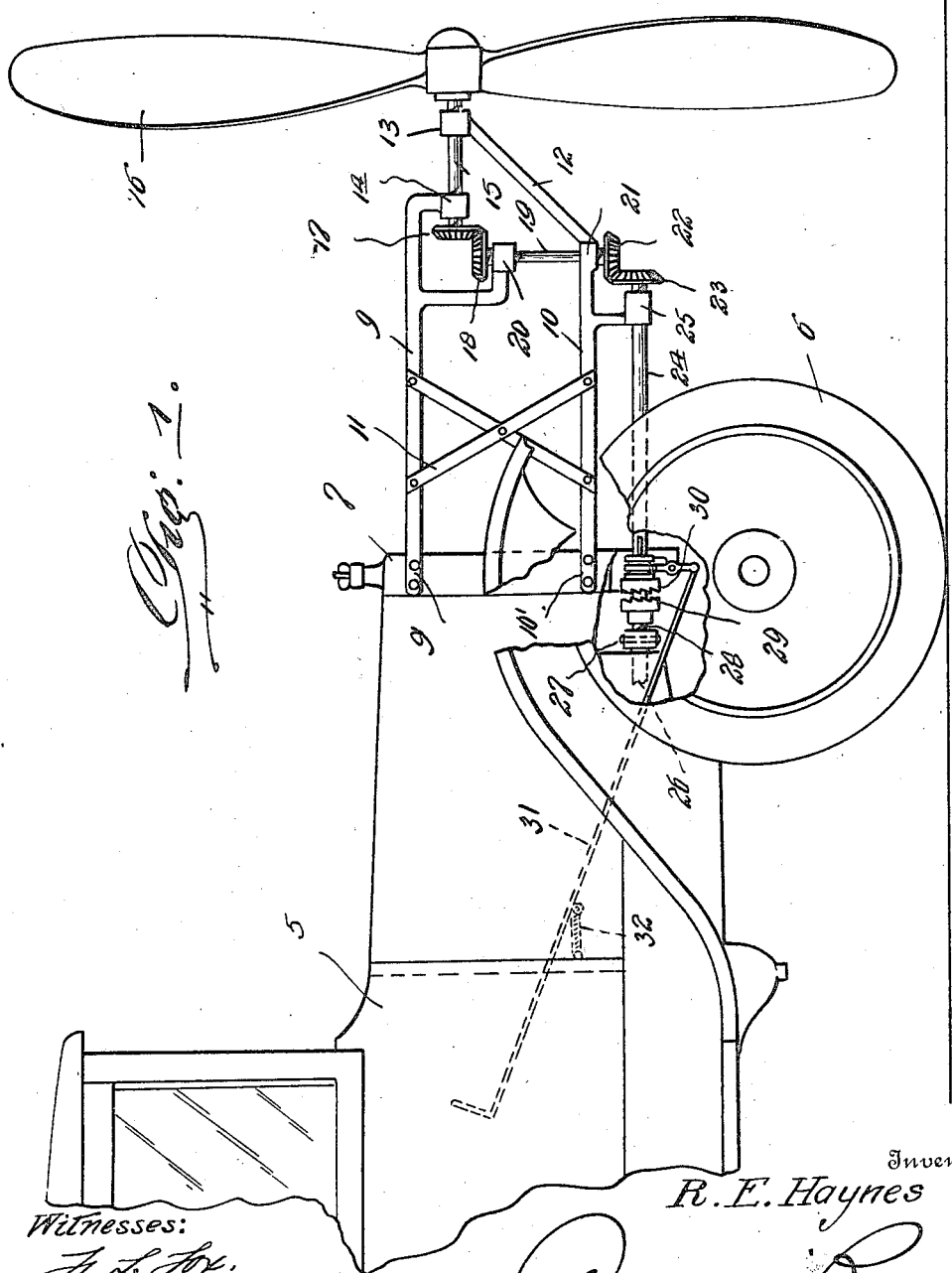
Figure 1 is a fragmentary side elevation of the front of a motor vehicle, equipped with my improved plow.
Figure 2:
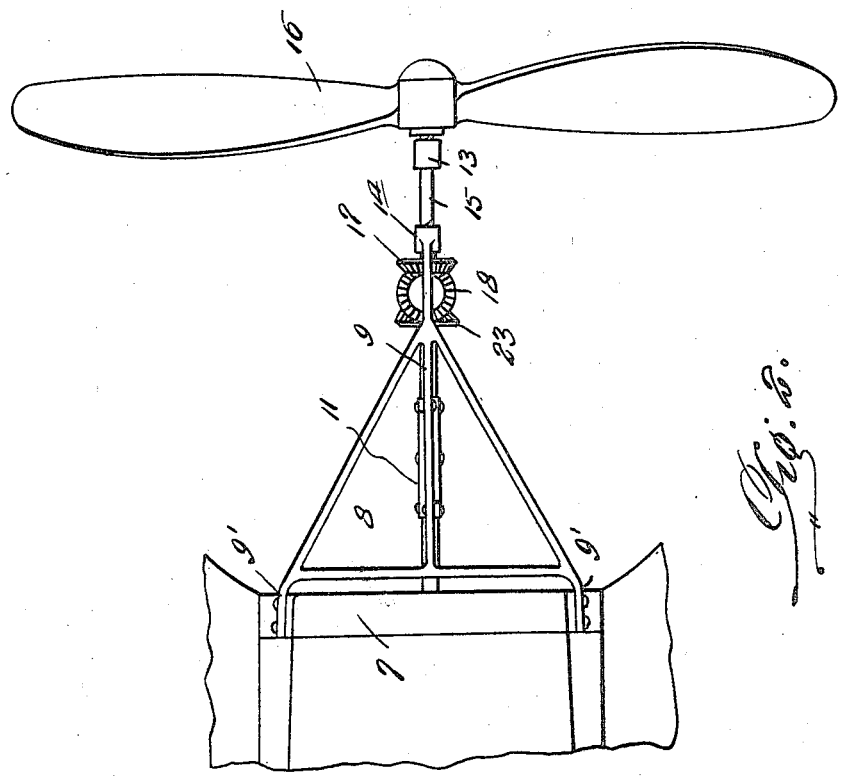
Figure 2 is a top plan view thereof.

With particular reference to the drawings, 5 indicates generally a motor vehicle, including the usual front steering wheels 6 and radiator 7. No claim is made to any particular form of vehicle, as my plow may be associated with practically all types of machines and the same is shown in the drawings merely for the purpose of more adequately disclosing the relationship of my plow therewith.

Among other elements, my device includes a supporting frame of general V formation that is secured to the front end of the vehicle and projects forwardly therefrom, this frame being designated generally 8. As more clearly shown, this frame comprises upper and lower substantially triangular shaped frame members 9 and 10, the inner larger ends of the same being formed with extensions 9' and 10', respectively that engage opposite sides of the radiator casing 7, and are secured thereto, through the medium of bolts or other suitable fastening means. These frame members are interconnected through the medium of cross strengthening bars 11.

The front end of the lower frame member 10 is provided with a forwardly and upwardly extending bar 12, that is formed on its free end with a horizontal shaft bearing 13 in spaced alinement with a horizontal shaft bearing 14, pendently formed upon the similar end of the upper frame member 9. Journaled within these bearings is a shaft 15 that carries upon its front end a relatively large propeller blade 16 of any form desirable. The inner end of the shaft 15 is equipped with a bevelled gear 17 that is in mesh with a bevelled gear 18 upon one end of a vertical shaft 19, the same being journaled within vertically alined, and spaced bearings 20 and 21, respectively, formed upon the frame members 9 and 10.

The lower end of this last mentioned shaft 19 is additionally equipped with a bevelled gear 22 that is in mesh with a bevelled gear 23 upon the front end of a horizontal shaft 24, this shaft being journaled in a bearing 25, that is formed upon the lowermost frame member 10 rearwardly of the shaft bearing 21.

Figure 3:
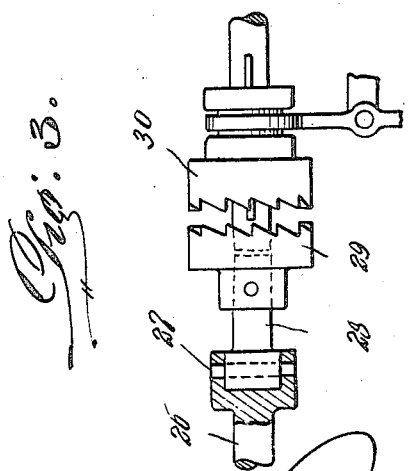
Figure 3 is an enlarged detail of the clutching and unclutching means between the plow and vehicle engine shaft.

The engine crank shaft of the vehicle 5 is designated 26, the front end thereof being rigidly connected at 27 to a form of stub shaft 28 that is equipped at its upper end with a clutch element 29. The front face of this clutch element is socketed as more clearly shown in Figure 3, and receives the inner end of the horizontal shaft 24, the same having splined thereon a complementary clutch element 30, that is actuated through the medium of a rearwardly extending rod 31, that extends upwardly to a point convenient to the operator of the motor vehicle. The clutch element 30 is normally maintained out of engagement with the clutch element 29 through the medium of a coiled spring 32, that is connected to the rod 31 at a convenient point of the motor vehicle.

In view of the above description, it will at once be apparent that when the rod 31 is pushed forwardly and maintained in such a position, preferably by foot pressure, the shaft 24 will be connected to the engine crank shaft 26, for thereby imparting rotation to the propeller blade 16, whereby when the same rotates, the snow forwardly of the vehicle will be effectively pushed to the side of the vehicle.

The advantages of a plow of this character will be readily appreciated by those skilled in the art, and even though I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters Patent, is:

A snow plow attachment for motor vehicles including upper and lower frame members of triangular form arranged in parallel spaced relation, securing bars joining said frames together for holding them in spaced relation, the ends of the frame at the base portion thereof being formed with extensions adapted for removable attachment to the radiator of a motor vehicle for mounting said frame on the vehicle, the forward portion of the lower frame being formed with an upwardly inclined extension terminating in a horizontal bearing, the upper frame having a forward extension formed with a depending end portion terminating in a horizontal bearing in line with the first mentioned bearing, said upper frame member being also formed with a depending portion in the rear of said end extension terminating in a lateral extending end portion provided with a vertical bearing in line with the vertical bearing in the lower frame member, a propeller shaft mounted in the horizontal bearing, a vertical shaft rotatable in said vertical bearing, a propeller mounted on a horizontal shaft in front of the bearing carrying said shaft, gear connections between the horizontal and vertical shafts, said lower frame having a depending projection formed at the end with a horizontal bearing, a power shaft having a removable clutch connection with the crank shaft to the engine of said vehicle, and a gear connection with the vertical shaft, whereby rotative movement is transmitted thru said power shaft to said propeller shaft for rotating the propeller thereon.

In testimony whereof I affix my signature.

ROBERT E. HAYNES.